(12) United States Patent
Englert et al.

(10) Patent No.: US 7,503,430 B2
(45) Date of Patent: Mar. 17, 2009

(54) REDUCED DUST ACOUSTIC PANEL

(75) Inventors: Mark H. Englert, Libertyville, IL (US); Salvatore C. Immordino, Jr., Trevor, WI (US)

(73) Assignee: USG Interiors, Inc., Chicago, IL (US)

( * ) Notice: Subject to any disclaimer, the term of this patent is extended or adjusted under 35 U.S.C. 154(b) by 287 days.

(21) Appl. No.: 11/516,966

(22) Filed: Sep. 7, 2006

(65) Prior Publication Data

US 2008/0060871 A1    Mar. 13, 2008

(51) Int. Cl.
*E04B 1/82* (2006.01)
*E04B 1/84* (2006.01)

(52) U.S. Cl. .............. 181/294; 181/290; 181/296; 106/772; 106/778; 427/391; 162/8; 162/168.1

(58) Field of Classification Search ......... 181/290, 181/294, 296; 106/778, 772; 427/391; 162/8; 126/168.1
See application file for complete search history.

(56) References Cited

U.S. PATENT DOCUMENTS

| 3,602,332 | A |   | 8/1971  | Hollenbeck |
|-----------|---|---|---------|------------|
| 4,190,456 | A |   | 2/1980  | Absolon et al. |
| 4,226,672 | A |   | 10/1980 | Absolon et al. |
| 4,353,949 | A |   | 10/1982 | Kyminas et al. |
| 4,474,920 | A |   | 10/1984 | Kyminas et al. |
| 4,613,627 | A |   | 9/1986  | Sherman et al. |
| 4,659,595 | A | * | 4/1987  | Walker et al. ............ 427/391 |
| 4,735,682 | A | * | 4/1988  | Didwania et al. ............ 162/8 |
| 4,902,348 | A |   | 2/1990  | Kossatz et al. |
| 5,019,311 | A |   | 5/1991  | Koslow |
| 5,087,603 | A |   | 2/1992  | Izubayashi et al. |
| 5,147,722 | A |   | 9/1992  | Koslow |
| 5,284,900 | A |   | 2/1994  | Izubayashi et al. |
| 5,491,020 | A |   | 2/1996  | Ide et al. |
| 5,580,378 | A |   | 12/1996 | Shulman |
| 5,622,556 | A |   | 4/1997  | Shulman |
| 5,651,816 | A |   | 7/1997  | Kobayashi et al. |
| 5,725,652 | A |   | 3/1998  | Shulman |
| 5,895,557 | A | * | 4/1999  | Kronzer ............ 162/168.1 |
| 6,030,673 | A | * | 2/2000  | Andersen et al. .......... 428/36.4 |
| 6,355,099 | B1 | * | 3/2002 | Immordino et al. ....... 106/778 |
| 6,379,458 | B1 | * | 4/2002 | Immordino et al. ....... 106/772 |
| 6,673,144 | B2 | * | 1/2004 | Immordino et al. ....... 106/778 |
| 2001/0001218 | A1 |  | 5/2001 | Luongo |
| 2003/0176298 | A1 | * | 9/2003 | Nakatani et al. ........... 508/398 |
| 2003/0178250 | A1 | * | 9/2003 | Putt et al. ................ 181/290 |
| 2004/0231916 | A1 | * | 11/2004 | Englert et al. ............ 181/296 |
| 2005/0235882 | A1 |  | 10/2005 | Lettkeman et al. |
| 2007/0102237 | A1 | * | 5/2007 | Baig ....................... 181/290 |
| 2008/0152945 | A1 | * | 6/2008 | Miller et al. ................ 428/688 |

* cited by examiner

*Primary Examiner*—Walter Benson
*Assistant Examiner*—Christina Russell
(74) *Attorney, Agent, or Firm*—Greer, Burns & Crain, Ltd.; David F. Janci, Esq.; Pradip Sahu, Esq.

(57) ABSTRACT

An acoustical panel includes an acoustical layer having an interlocking matrix of calcium sulfate dihydrate, polyethylene glycol and at least one of the group fibers, a lightweight aggregate and mixtures thereof. The acoustical layer has voids in the interlocking matrix that are configured to absorb sound. The polyethylene glycol is selected to agglomerate dust at temperatures generated by friction when the panel is cut. A method of making the acoustical panel includes making a slurry comprising calcium sulfate hemihydrate, polyethylene glycol, water and at least one of the group consisting of a lightweight aggregate, fibers and combinations thereof. Foam is added to the slurry, preferably at the mixer discharge. A continuous strip of acoustical layer material is formed from the slurry. The acoustical panels are formed by cutting the strip into individual panels. Finally, the partially hydrated calcium sulfate hemihydrate is allowed to fully set.

24 Claims, No Drawings

REDUCED DUST ACOUSTIC PANEL

FIELD OF THE INVENTION

This invention is related to a ceiling tile that is manufactured on a gypsum board line and reduces dusting when cut.

BACKGROUND

Acoustical, or ceiling, panels are well known for providing a finished appearance to a ceiling area and also providing a sound absorbent surface where needed. Ideally, the panels combine acoustic absorbency with durability for long life. Mineral wool is commonly used because it provides a porous fibrous structure for absorbing sound. Other common materials used in the manufacture of ceiling panels include fiberglass, expanded perlite, clay, gypsum, stucco, calcium carbonate and paper fiber.

Many ceiling panels are made in a manner similar to the process used to make paper or fiberboard. In this water-felting process, an aqueous dispersion of the fibers, aggregates, binders, and other additives is dispensed onto a porous surface or wire where the furnish is dewatered, both by gravity and by vacuum suction. The wet mat is dried in a convection oven and then cut into desired lengths. If desired, the surface is painted to produce a finished panel. An example of such a panel is the AURATONE® ceiling tile made by USG Interiors (Chicago, Ill.).

Another process for making ceiling panels is by casting, as described in U.S. Pat. No. 1,769,519. A composition of mineral wool fibers, fillers, colorants, a binder such as cooked starch and water is placed in trays covered with paper or paper-backed foil. The composition is then screeded with a forming plate to the desired thickness. A decorative surface, such as an embossed pattern, is obtainable by imparting a pattern into the surface of the cast material by use of a screed bar or a patterned roll. ACOUSTONE® ceiling tile by USG Interiors (Chicago, Ill.) is an example of such a cast panel.

Both of these methods of making ceiling panels are relatively expensive because they utilize large amounts of water and energy. Hygroscopic binders, such as paper or starch, result in panels that are susceptible to sag. Sagging of the panel can be accentuated when the panel supports insulation or other loads or when subjected to high levels of humidity and temperature.

Gypsum panels are less prone to sag and are manufactured efficiently in a high-speed process. However, gypsum is heavy and it lacks acoustical absorbency. It is currently adaptable for use as acoustical ceiling panels by including holes in the panels and positioning a sound-absorbing backing on the back of the perforated panel. While the holes provide some weight reduction and sound absorbance, they are not accepted by consumers as being aesthetically pleasing.

Another gypsum panel having an acoustical layer is described in U.S. Patent Publication No. 2004/0231916. One embodiment of this panel has an acoustical layer of foamed gypsum formed on a backing sheet for strength. The panel is lightweight, sag resistant and aesthetically pleasing.

This layered gypsum panel has a disadvantage. During installation, the panels are cut to fit the shape of the ceiling and/or the openings in a structure that holds them in place, such as a ceiling grid. Cutting through the composite of gypsum generates fine airborne dust that takes a long time to settle due to the small particle size of the dust. The fineness of the dust allows it to travel long distances before finally settling out. The cutting action can create nuisance dust which can reduce visibility, as well as get into the eyes, ears and nose. After settling out, there is a huge mess to clean up since the fine dust can permeate doors and other barriers, and can settle some distance from where the cutting takes place.

Dust reduction during sanding, cutting and abrading has become an important feature for gypsum products. U.S. Pat. No. 6,863,723 to 3M suggests reduction of dust by the addition of one of several dust reducing agents to gypsum containing products. U.S. Pat. No. 6,673,144 to United States Gypsum Company features a joint compound having polyethylene glycol, where the polyethylene glycol is a solid at room temperature. A sprayable plaster that utilizes polyethylene glycol as an internal binder produces less fine dust when machined in U.S. Pat. No. 6,355,099. None of these references disclose the addition of polyethylene glycol to an acoustic panel.

SUMMARY OF THE INVENTION

The needs of the prior art are addressed by the present invention which features an acoustical panel including an acoustical layer and an agglomeration additive to reduce dusting when cut.

More specifically, the acoustical layer has an interlocking matrix of calcium sulfate dihydrate, dedusting agent and at least one of the group consisting of fibers, a lightweight aggregate and mixtures thereof. The acoustical layer has voids in the interlocking matrix that are configured to absorb sound. The polyethylene glycol is selected to agglomerate dust fines at temperatures generated by friction when the panel is cut.

A method of making the acoustical panel includes making a slurry comprising calcium sulfate hemihydrate, polyethylene glycol, water and at least one of the group consisting of a lightweight aggregate, fibers and combinations thereof. Foam is added to the slurry, preferably at the mixer discharge. A continuous strip of acoustical layer material is formed from the slurry. The acoustical panels are formed by cutting the strip into individual panels. Finally, the partially hydrated calcium sulfate hemihydrate is allowed to fully set.

Optionally, the panel also includes one or more of a scrim layer, a densified layer and a backing sheet. These optional layers provide protection and support for the acoustical layer. Lightweight acoustical panels can be brittle and easily broken. Inclusion of the scrim layer, densified layer and backing layers provide support, allowing the panels to be cut and hung with a reduction in breakage. Use of support also reduces sag where the panels are supported only by the corners or edges, as where a suspended ceiling grid is used.

Addition of polyethylene glycol also reduces the amount of fine, airborne dust generated when the tile is cut. The selection of the specific polyethylene glycol is critical. The polyethylene glycol is selected to be in solid form at room temperature. Under the pressure and friction of being cut, it is converted into a liquid or tacky form that agglomerates the dust. The resulting particles are large enough to rapidly fall to the ground to be swept up and easily disposed of. This composition minimizes the airborne spread of dust fines so that the gypsum dust is not allowed to spread over a wide area.

DETAILED DESCRIPTION OF THE INVENTION

The present invention provides an improved acoustical panel that is lightweight, reduces sound and reduces dusting when cut. This panel includes an acoustical layer having an interlocking matrix of calcium sulfate dihydrate crystals and a suitable agglomeration additive that acts to bind dust fines when cut, such as polyethylene glycol. Preferably, the density of the acoustical layers is from 10 lb/ft³ to about 25 lb/ft³. More preferably, the density ranges from about 12 lb/ft³ to about 20 lb/ft³, with a density of about 16-20 lb/ft³ being most preferred. The panels optionally include a densified layer, a scrim layer or both.

Calcined gypsum is preferably used to make the acoustical layer. Any calcined gypsum comprising calcium sulfate hemihydrate or water-soluble calcium sulfate anhydrite or both is useful. Calcium sulfate hemihydrate produces at least two crystal forms, the alpha and beta forms. Beta calcium sulfate hemihydrate is commonly used in gypsum board panels, but is also contemplated that layers made of alpha calcium sulfate hemihydrate are also useful in this invention. Either or both of these forms is used to create a preferred acoustical layer that is at least 50% gypsum based on the weight of the acoustic layer. Preferably, the amount of gypsum is at least 80%. In some embodiments, the acoustical layer is at least 98% gypsum by weight. Where the water-soluble form of calcium sulfate anhydrite is used, it is preferably used in small amounts of less than 20%.

One or more dedusting agents are added to the present acoustic layer to reduce fine dust generated during cutting of the panel. Dedusting agents are an inert, non-reactive, readily dispersed additive that tends to adsorb to the surface of the fine dust particles while at the same time having an affinity to itself. The preferred dedusting agent is one that is a solid at room temperature, melts under cutting conditions, and then resolidifies to agglomerate and bind the dust fines as the cuttings fall away from the panel.

Dedusting agents include water soluble linear polymers formed by the addition reaction of ethylene oxide and/or alkoxy-substituted ethylene oxide in water. Polyethylene glycol ("PEG"), methoxypolyethylene glycol ("MPEG"), polyoxyethylene glycol, trifunctional polyethylene glycol ("TPEG") or combinations thereof are most preferred as dust control agents. Since ceiling tiles are cut with a utility knife at the job site, the PEG should melt at a particularly low temperature. Low melting solids that have been found to work well include M750 by Clariant (Clariant Corporation, Mount Holly, N.C.). Preferably, dedusting agents with melting points above room temperature (21-23° C.) are sufficiently hard to be preferred for use with this invention.

Polyethylene glycols having melting points just above room temperature are preferably utilized with this invention for a number of reasons. These materials have phase change characteristics which are directly related to their molecular weight. Lower molecular weight polyethylene glycols exist as a liquid at room temperature while higher molecular weights exist as a solid. The solid forms make them suitable for use in the preparation of dry compositions, as well as liquid forms. The lower molecular weight forms can adsorb on the surface of dust fines thereby sticking them together while the higher molecular weight forms can both surface adsorb and mechanically agglomerate the dust fines via phase change from solid to liquid. Molecular weight also impacts the degree of solubility. Higher molecular weight polyethylene glycols have lower solubility than lower molecular weight polyethylene glycols. The lower solubility of the solid forms makes them less susceptible to leaving concentration gradients upon drying as a result of transport by water migration via evaporation. Polyethylene glycols with molecular weights greater than or equal to 200 g/mole are suitable. Preferably, the molecular weight of PEG ranges from about 750 g/mole to about 3,000 g/mole and most preferably from about 750 g/mole to about 1,100 g/mole.

The dedusting agent is added in any suitable amount. Preferably, it is present in a concentration ranging from about 0.1% to 8% of the dry weight of the joint compound. In another preferred range, it is added at concentrations between about 0.5% and about 8%, and more preferably between about 0.5% and about 4.0%. If it is in a dry powder form, the dedusting agent is preferably metered into the other dry ingredients.

Other potentially suitable dedusting agents include low-melting paraffin waxes chosen to have the same melting point range as noted above. Low melting paraffin waxes that have been evaluated include Waxrex 2401 by ExxonMobil (Exxon Mobil, Fairfax, Va.) as well as others from Borden and Henry.

A slurry for making the acoustical layer is made of water, calcium sulfate hemihydrate, and the dedusting agent. Water is present in any amount useful to make the layers. Sufficient water is added to the dry components to make a flowable slurry. A suitable amount of water exceeds 75% of the amount needed to hydrate all of the calcined gypsum to form calcium sulfate dihydrate. The exact amount of water is determined, at least in part, by the application with which the product will be used and the amount and type of additives used. Water content is determined, in part, by the type of calcined gypsum that is used. Alpha-calcined stucco requires less water to achieve the same flowability as beta-calcined stucco. A water-to-stucco ratio is calculated based on the weight of water compared to the weight of the dry calcined gypsum. Preferred ratios range from about 0.5:1 to about 1.5:1. Preferably, the calcined gypsum is primarily a beta hemihydrate in which case the water to calcined gypsum ratio is preferably from about 0.7:1 to about 1.5:1, more preferably, from about 0.7:1 to about 1.4:1, even more preferably, from about 0.75:1 to about 1.2:1, and still more preferably from about 0.77:1 to about 1.1:1.

Water used to make the slurry should be as pure as practical for best control of the properties of both the slurry and the set plaster. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical.

In some preferred embodiments, fibers are optionally added to improve the finished panel and enhance the green strength of the wet panel. Cellulosic fibers, such as paper and recycled newsprint, having fibers less than about 3 mm are preferred. Preferred fibers have an average maximum diameter of about 2 mm or less. It is believed that cellulosic fibers bond with the set gypsum matrix, making it less brittle. Although cellulosic fibers are preferred, the use of other fibers is contemplated. Fibers are present in the finished layer in amounts up to about 12% by weight. Some commercially available paper fibers, such as Kayocel 1650 (American Fillers and Abrasives) include up to 50 weight % calcium carbonate. The presence of the calcium carbonate is acceptable and is advantageous because it prevents clumping of the paper fiber during processing.

Another optional component of the acoustical layer is a lightweight aggregate. The lightweight aggregates preferably have a density less than about 10 lb/ft³ and provide filler space to reduce the density and weight of the acoustical panel. Examples of suitable lightweight aggregates include, but are not limited to, expanded polystyrene, expended vermiculite, expanded perlite, ceramic microspheres, resin microspheres and the like or combinations thereof. Hydrophilic aggregates are less desirable because they increase the water demand of the slurry and increase the amount of energy needed to dry the acoustical layer. Hydrophobic materials, such as chopped, expanded polystyrene, are preferred lightweight aggregates.

The lightweight aggregate is provided in any amount to produce the desired amount of filler space, reduction in overall density and/or finished panel weight. For example, the lightweight aggregate is present in an amount of from about 0.2% to about 35% by weight of the finished layer. Expanded perlite, expanded vermiculite and expanded polystyrene are examples of preferred lightweight aggregates. In preferred embodiments, a finely chopped expanded polystyrene has a bulk density of about 0.2 lb/ft$^3$ to about 0.5 lb/ft$^3$, the lightweight aggregate is provided in an amount of about 0.2% by weight to about 3% by weight of the solids content of the layer. Preferably, the expanded polystyrene has an average length of 2 mm or less.

A set accelerator is also an optional component of this composition. "CSA" is a gypsum set accelerator comprising 95% calcium sulfate dihydrate co-ground with 5% sugar and heated to 250° F. (121° C.) to caramelize the sugar. CSA is available from United States Gypsum Company, Southard, Okla. plant, and is made according to commonly owned U.S. Pat. No. 3,573,947, herein incorporated by reference. HRA is calcium sulfate dihydrate freshly ground with sugar at a ratio of about 5 to 25 pounds of sugar per 100 pounds of calcium sulfate dihydrate. It is further described in U.S. Pat. No. 2,078,199, herein incorporated by reference. Both of these are preferred accelerators. The use of any gypsum accelerator, or combinations thereof, in appropriate amounts is contemplated for use in this invention.

Binders are also optionally added to the calcined gypsum slurry to improve the integrity of the set gypsum matrix and to improve bonding of the acoustical layer to the optional backing sheet. Any suitable binder or combination of binders may be used. The binder is preferably included in the aqueous calcined gypsum slurry. Preferably, the binder is a starch, such as corn or wheat starch, a latex, such as polyvinyl acetate, acrylic and styrene butadiene latexes, or combinations thereof. A preferred binder is an acrylic binder that forms a self-linking acrylic emulsion, such as RHOPLEX HA-16, available from Rohm and Haas (Philadelphia, Pa.). Acrylic binders are preferably used in amounts of from about 0.5% to about 5%, more preferably from about 0.8% to about 1.5%, by weight of the dried acoustic layer.

The starch binder is optionally included in either the acoustical layer or the densified layer or both. Either migrating or non-migrating starches are useful. Non-migrating starches are also applicable by solution directly to a paper backing sheet to enhance bonding with the gypsum. Starch is preferably present in amounts of from about 0.8% to about 1.5% by weight of the dried acoustic layer. Examples of pregelatinized, non-migrating starches useful in this acoustical layer include GemGel Starch (Manildra Group USA, Shawnee Mission, Kans.) and PCF 1000 (Lauhoff Grain Co., St. Louis, Mo.). Examples of non-pregelatinized, non-migrating starches include Minstar 2000 and Clinton 106 Corn Starch (both from Archer Daniels Midland Co., Decatur, Ill.). Examples of migrating starches include Hi-Bond Starch and LC-211 starch (both from Archer Daniels Midland Co., Decatur, Ill.).

Another optional component of the acoustic layer is a water reducing agent that enhances the fluidity of the slurry and makes it flowable when less water is added. Polysulfonates, melamine compounds and polycarboxylates are preferred water reducing agents and are included in the slurry in amounts of up to 1.5% based on the dry weight of the ingredients. Where the water reducing agent is added in the form of a liquid, amounts are to be calculated based on the dry solids weight. Preferred water reducing agents are DiloFlo GW (GEO Specialty Chemical, Lafayette, Ind.) and EthaCryl 6-3070 (Lyondell Chemical Co., Houston, Tex.)

One or more enhancing materials are optionally included in the slurry to promote strength, dimensional stability or both. Preferably, the enhancing material is a trimetaphosphate compound, an ammonium polyphosphate having 500-3000 repeating units and a tetrametaphosphate compound, including salts or anionic portions of any of these compounds. Hexametaphosphate compounds are effective for enhancing sag resistance, but are less desirable because they act as set retarders and reduce strength. Enhancing materials are described in commonly owned U.S. Pat. No. 6,342,284. Trimetaphosphate compounds are especially preferred. The enhancing materials are used in any suitable amount, preferably from about 0.004% to about 2% by weight based on the dry weight of the ingredients.

Foam is added to the slurry as it exits the slurry mixer to promote formation of voids in the set gypsum matrix, thereby improving the acoustic absorption and reducing the weight. Any conventional foaming agents known to be useful in gypsum products are useful in this application. Preferably, the foaming agent is selected so that it forms a stable foam cell in the acoustical layer. More preferably, at least some of the voids interconnect so as to form an open cell structure. The preferred foam volume is from about 35% to about 60%, more preferably from about 40% to about 55% and even more preferably from about 45% to about 50% (OK). Suitable foaming agents include alkyl ether sulfates and sodium laureth sulfates, such as STEOL® CS-230 (Stepan Chemical, Northfield, Ill.). The foaming agent is added in an amount sufficient to obtain the desired acoustical characteristics in the acoustical layer. Preferably, the foaming agent is present in amounts of about 0.003% to about 0.4% based on the weight of the dry ingredients, and more preferably from about 0.005% to about 0.03%. Optionally, a foam stabilizer is added to the aqueous calcined gypsum slurry in a suitable amount.

The calcined gypsum, dedusting agent and optional dry components are combined with water in the slurry mixer to form the slurry. Preferably, all dry components, such as the calcined gypsum, dedusting agent, aggregate, set accelerator, binder and fibers, are blended in a powder mixer prior to addition to the water. Liquid ingredients are added directly to the water before, during or after addition of the dry components. After mixing to obtain a homogeneous slurry, the slurry exits the slurry mixer where the foam is added.

Prior to being added to the slurry, the foaming agent is combined with foam water to make a foam, which is then added to the slurry at the discharge of the slurry mixer. Once the foam is added to the slurry, it is discharged to a moving conveyor, either directly onto the conveyor surface or onto the optional backing sheet.

The backing sheet supports the acoustic layer during manufacture by transferring stresses across the length of the panel, especially while the panel is wet. It is analogous to the facing material used in gypsum wallboard manufacture. In preferred embodiments, the backing sheet is paper, including manila paper or kraft paper, non-woven glass, metallic foil or combinations thereof. Where paper is selected as the backing sheet, multi-ply paper, such as conventional wallboard paper, is useful. The number of plies optionally varies from 1-8 plies, depending on the paper chosen.

In some embodiments, a densified layer is optionally positioned between the backing sheet and the acoustical layer. This layer enhances both the wet and dry strength of the panel, making it less likely to break during processing and cutting or during normal wear and tear. The densified layer is preferably relatively thin compared to the acoustic layer and is, for example, about 0.05 inches to about 0.3 inches, more preferably 0.125 inches to about 0.25 inches and even more preferably from about 0.175 inches to about 0.225 inches. This layer preferably has a density of at least about 30 lbs/ft³, more preferably at least 35 lbs/ft³, and still more preferably from about 40 lbs/ft³ to about 45 lbs/ft³.

The densified layer includes at least gypsum, but optionally includes any or all of the additives incorporated into the acoustical layer. Preferably, the densified layer is a slip stream of the slurry made into the acoustical layer that has been made more dense by destruction of all or a portion of the foam. One method of achieving a densified layer is by using edge mixers that beat the fluid stream to break bubbles of the foam. Alternatively, the densified layer can be made from a slip stream of the slurry that is taken prior to foam addition or the densified layer is optionally made from an entirely separate layer.

The scrim layer is another optional component of the acoustical panel. It is positioned adjacent to the acoustical layer. When the optional densified layer is used, the scrim layer is preferably positioned between the acoustical layer and the densified layer. If both the densified layer and the backing sheet are both featured in the acoustical panel, the panel is preferably structured to have the acoustical layer, the scrim layer, the densified layer, and the backing sheet placed in that order. An alternative structure that can also be used is to have the scrim layer as the facing material, followed by the acoustical layer, the densified layer, and the backing layer placed in that order. The scrim layer is selected to have expansion properties similar to the backing layer to prevent warping under various humidities. Preferably, the scrim layer is porous to facilitate attachment of the layers and to facilitate drying of the acoustical layer. If the scrim layer is used as the facing material, the scrim layer is chosen to be acoustically transparent. Any material that provides support for the acoustical layer and has expansion properties compatible with the backing sheet, if used, is useful as a scrim layer. Preferably, paper, such as that used as the backing layer, non-woven fiberglass scrims, woven fiberglass mats, other synthetic fiber mats such as polyester and combinations thereof are useful as scrim layers. IMPERIAL® gypsum base face paper used with IMPERIAL® plaster (both made by USG Corporation, Chicago, Ill.) are preferred scrim materials. Preferably, where paper is used as the scrim layer, the exterior plies are preferably not treated with a waterproofing agent.

In embodiments of the panel that include the scrim layer, another optional component is a scrim binder to improve adhesion of the scrim layer to the acoustical layer or the densified layer. The scrim binder is optionally applied to one or both of the scrim surfaces, or it is optionally added to the slurry that forms the acoustical layer. Application of the scrim binder can be accomplished by spreading, rolling, spraying, screeding or any other application method known to one skilled in the art of applying such materials. The preferred scrim binder is a pregelatinized starch.

While individual acoustical panels can be made in batch processes as are known in the art, it is more advantageous to make them in a continuous process formed into a continuous panel that is cut into panels of desired lengths. The formed backing sheet is obtained and put into place to receive the gypsum slurry. Preferably, the backing sheet, if present, is of a width to form a continuous strip of panel that requires only two cuts to make a panel with the desired finished dimensions. Any known backing sheet is useful in making the wallboard panels, including paper, glass mat and plastic sheeting. Preferably the facing is a multiply paper backing sheet. The backing sheet is continuously fed to the board line.

The slurry is formed by mixing the dry components and the wet components together. Dry components of the slurry, the calcined gypsum and any dry additives, are blended together prior to entering the mixer. Water is measured directly into the mixer. Liquid additives are added to the water, and the mixer is activated for a short time to blend them. If one or more modifiers are used in the formulation, the modifier is preferably added to the mixer with the dispersant, prior to addition of the stucco. The dry components are added to the liquid in the mixer, and blended until the dry components are moistened.

As the water to stucco ratio drops, attention should be paid to the load placed on the mixer. Reducing the slurry water increases the viscosity of the composition during mixing. Even when a sufficient amount of dispersant is added to produce a flowable mixture, the heaviest load occurs during the initial mixing, before the dispersant has an opportunity to disperse the gypsum particles. Longer mixing times have no deleterious effect on the final product.

The slurry is then mixed to achieve a homogeneous slurry. Usually, an aqueous foam is mixed into the slurry to control the density of the resultant core material. Such an aqueous foam is usually generated by high shear mixing of an appropriate foaming agent, water and air prior to the introduction of the resultant foam into the slurry. The foam can be inserted into the slurry in the mixer, or preferably, into the slurry as it exits the mixer in a discharge conduit. See, for example, U.S. Pat. No. 5,683,635, herein incorporated by reference. In a gypsum board plant, frequently solids and liquids are continuously added to a mixer, while the resultant slurry is continuously discharged from the mixer, and has an average residence time in the mixer of less than 5 seconds.

The slurry is continuously dispensed through one or more outlets from the mixer through a discharge conduit as a continuous strip and deposited onto a conveyor. The conveyor carries the strip to a knife where it is cut into panels of preselected dimensions.

Preferably, a two-stage drying process is employed. The panels are first subjected to a high temperature kiln to rapidly heat up the board and begin to drive off excess water. The temperature of the kiln and the residence time of the board vary with the thickness of the panel. By way of example, a ½-inch board (12.7 mm) is preferably dried at temperatures in excess of 300° F. (149° C.) for approximately 20 to 50 minutes. As water at the surface evaporates, it is drawn by capillary action from the interior of the panel to replace the surface water. The relatively rapid water movement assists migration of the starch and the pyrithione salt into the paper. A second-stage oven has temperatures less than 300° F. (149° C.) to limit calcination of the board.

EXAMPLE

A board core material was produced in the laboratory with and without the addition of a dedusting agent. Methoxypolyethylene glycols of varying average molecular weights were prepared and tested for physical properties, cutability and generation of fine, airborne dust. The dedusting agents from Clariant Corporation are designated "M" to signify a methyl polyethylene glycol, as well as a number representing the average molecular weight. Thus, "M500" is a methyl polyethylene glycol having an average molecular weight of 500 g/mole.

The base composition included 1.2% of a medium grade, chopped, expanded polystyrene, 0.5% CSA gypsum set accelerator, 0.02% surfactant, 2% paper fiber, dispersant and the remainder of the solids was board stucco (beta-calcined calcium sulfate hemihydrate). The type and amount of MPEG added to each sample is shown in Table I.

The solid materials were premixed in a twin-shell mixer, then combined with the liquid ingredients in Hobart mixers using a "whip" paddle. The Modulus of Rupture ("MOR") was tested using an Instron Model 1130 test instrument. The Corrected Modulus of Rupture ("CMOR") adjusts the MOR for differences in density of the sample. Cutability was measured quantitatively by securing a mat knife to a testing jig to objectively measure the amount of force necessary to cut through the board sample. Dusting was determined objectively by observing the amount of airborne dust compared to the dust that fell to the substrate when cut. Both cutability and dust generation are reported on a scale of 0-10, where 0 is worst and 10 is best.

TABLE I

| Board | PEG Type | PEG % | Thickness | Density | MOR | CMOR | Cutability | Dust |
|---|---|---|---|---|---|---|---|---|
| 1 | None | 0 | 0.557 | 17.27 | 41.1 | 33.5 | 4 | 3 |
| 2 | M250 | 4.0 | 9.555 | 17.49 | 36.0 | 29.1 | 9 | 2 |
| 3 | M250 | 4.0 | 0.534 | 19.21 | 44.6 | 29.5 | NA | NA |
| 4 | M500 | 4.0 | 0.562 | 17.05 | 39.3 | 33.5 | NA | NA |
| 5 | M500 | 4.0 | 0.549 | 17.34 | 39.8 | 32.7 | 9 | 7 |
| 6 | M750 | 4.0 | 0.535 | 19.67 | 57.9 | 36.8 | NA | NA |
| 7 | M750 | 4.0 | 0.528 | 16.23 | 38.8 | 36.1 | 9 | 7 |
| 8 | M1100 | 4.0 | 0.557 | 17.84 | 54.5 | 42.7 | 9 | 9 |
| 9 | M1100 | 4.0 | 0.519 | 18.24 | 55.4 | 41.2 | NA | NA |
| 10 | None | 0 | 0.562 | 15.86 | 30.3 | 29.0 | NA | NA |

There was a clear difference in the smoothness of the cut and the degree of dusting between samples containing MPEG and the control samples. On a qualitative basis, the samples produced with M750 and M1100 achieved the smoothest cut and the least airborne dust.

While a particular embodiment of the low dusting acoustical panel has been shown and described, it will be appreciated by those skilled in the art that changes and modifications may be made thereto without departing from the invention in its broader aspects and as set forth in the following claims.

What is claimed is:

1. An acoustical panel comprising an acoustical layer comprising an interlocking matrix of calcium sulfate dihydrate, a dedusting agent and at least one of the group consisting of fibers, a lightweight aggregate and mixtures thereon, wherein voids in said interlocking matrix are configured to absorb sound and wherein said dedusting agent is selected to agglomerate dust at temperatures generated by friction when said panel is cut; and wherein said lightweight aggregate is present in concentrations of less than 3% by weight of the acoustical panel.

2. The panel of claim 1 wherein said dedusting agent has a melting point less than 55° C.

3. The panel of claim 1 wherein said fibers comprise paper.

4. The panel of claim 1 wherein said calcium sulfate dihydrate is present in concentrations of at least 85% by weight of the acoustical panel.

5. The panel of claim 1 wherein said fibers are present in concentrations of less than 3% by weight of the acoustical panel.

6. The panel of claim 1 wherein said lightweight aggregate is at least one of the group consisting of expanded vermiculite, expanded perlite and chopped expanded polystyrene.

7. The panel of claim 1, further comprising at least one backing sheet.

8. The panel of claim 1 wherein said backing sheet comprises paper.

9. The panel of claim 1, further comprising a densified layer being more dense than said acoustical layer.

10. The panel of claim 9, further comprising a backing sheet.

11. The panel of claim 10 wherein said densified layer is positioned between said acoustical layer and said backing sheet.

12. The panel of claim 10 further comprising a scrim layer.

13. The panel of claim 12 wherein said scrim layer comprises a multi-ply paper sheet.

14. The panel of claim 13, wherein said panel comprises said acoustical layer, said scrim layer, said densified layer and said backing sheet positioned in that order.

15. The panel of claim 13, wherein said panel comprises said scrim layer, said acoustical layer, said densified layer and said backing sheet positioned in that order.

16. The panel of claim 1 having a void volume of at least 35% of the panel volume.

17. The panel of claim 16 having a void volume of at least 45% of the panel volume.

18. The panel of claim 1 further comprising an enhancing material comprising at least one of the group consisting of an ammonium polyphosphate, a trimetaphosphate compound, a tetrametaphosphate compound, a hexametaphosphate compound and combinations thereof.

19. The panel of claim 1 further comprising at least one of the group consisting of a set accelerator, a water reducing agent and combinations thereof.

20. A slurry for making an acoustical panel consisting essentially of calcium sulfate hemihydrate, reinforcing fibers, a lightweight aggregate and polyethylene glycol; and wherein said lightweight aggregate is present in concentrations of less than 3% by weight of the acoustical panel.

21. A method of making an acoustical panel comprising:
making a slurry comprising calcium sulfate hemihydrate, a dedusting agent, water and at least one of the group consisting of a lightweight aggregate, fibers and combinations thereof; and wherein said lightweight aggregate is present in concentrations of less than 3% by weight of the acoustical panel;
adding foam to the slurry;
forming a continuous strip of the slurry of acoustical layer material;
cutting the strip to form the acoustical panel; and
allowing the calcium sulfate hemihydrate to set.

22. The method of claim 21 further comprising drying the panel.

23. The method of claim 21 further comprising positioning a scrim layer to receive the slurry and wherein the continuous strip of said forming step is formed by distributing the slurry over the scrim layer.

24. The method of claim 21 further comprising dividing the slurry into a main stream and a slip stream prior to the forming step; making a densified layer from the slip stream; and wherein the continuous strip of said forming step is formed by distributing the slurry over the densified layer.

* * * * *